United States Patent [19]

Perry

[11] 4,422,667
[45] Dec. 27, 1983

[54] SUSPENSION FOR A TRACTOR-SCRAPER

[75] Inventor: Gary D. Perry, Lubbock, Tex.

[73] Assignee: Eagle-Picher Industries, Inc., Cincinnati, Ohio

[21] Appl. No.: 335,872

[22] Filed: Dec. 30, 1981

[51] Int. Cl.³ .............................................. B60G 11/26
[52] U.S. Cl. ............................... 280/705; 180/73 TL; 280/489; 280/713
[58] Field of Search ....................... 280/705, 713, 489; 180/73 TL, 14 R; 267/64.11, 64.13

[56] References Cited

U.S. PATENT DOCUMENTS 4,149,606 4/1979 Hawk .................................. 180/14 R

FOREIGN PATENT DOCUMENTS 2242042 2/1974 Fed. Rep. of Germany ..... 180/73.4
2354733 5/1974 Fed. Rep. of Germany ..... 180/73.4

Primary Examiner—Robert R. Song
Attorney, Agent, or Firm—Wood, Herron & Evans

[57] ABSTRACT

A suspension for a scraper-tractor. The tractor has an axle housing which is supported on a frame by hydraulic cylinders connected to a hydraulic circuit that includes a gas-filled accumulator to provide cushioning of the frame with respect to the axle housing. A pair of longitudinal arms are connected at one end by ball joints to the frame. At their other ends, the arms are connected by vertical pivot pins to the axle housing. A transverse track bar is connected between the frame and the housing.

4 Claims, 6 Drawing Figures

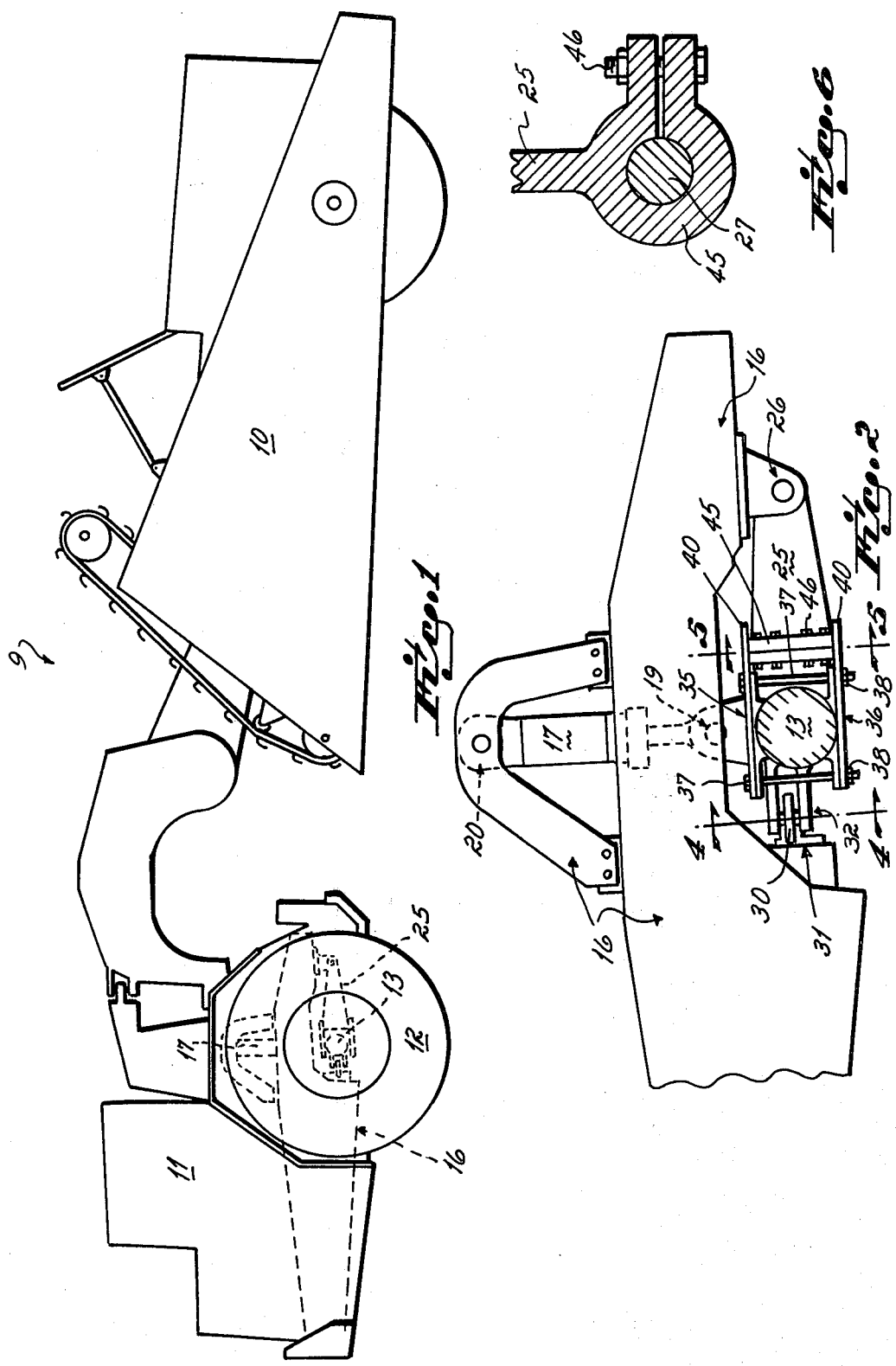

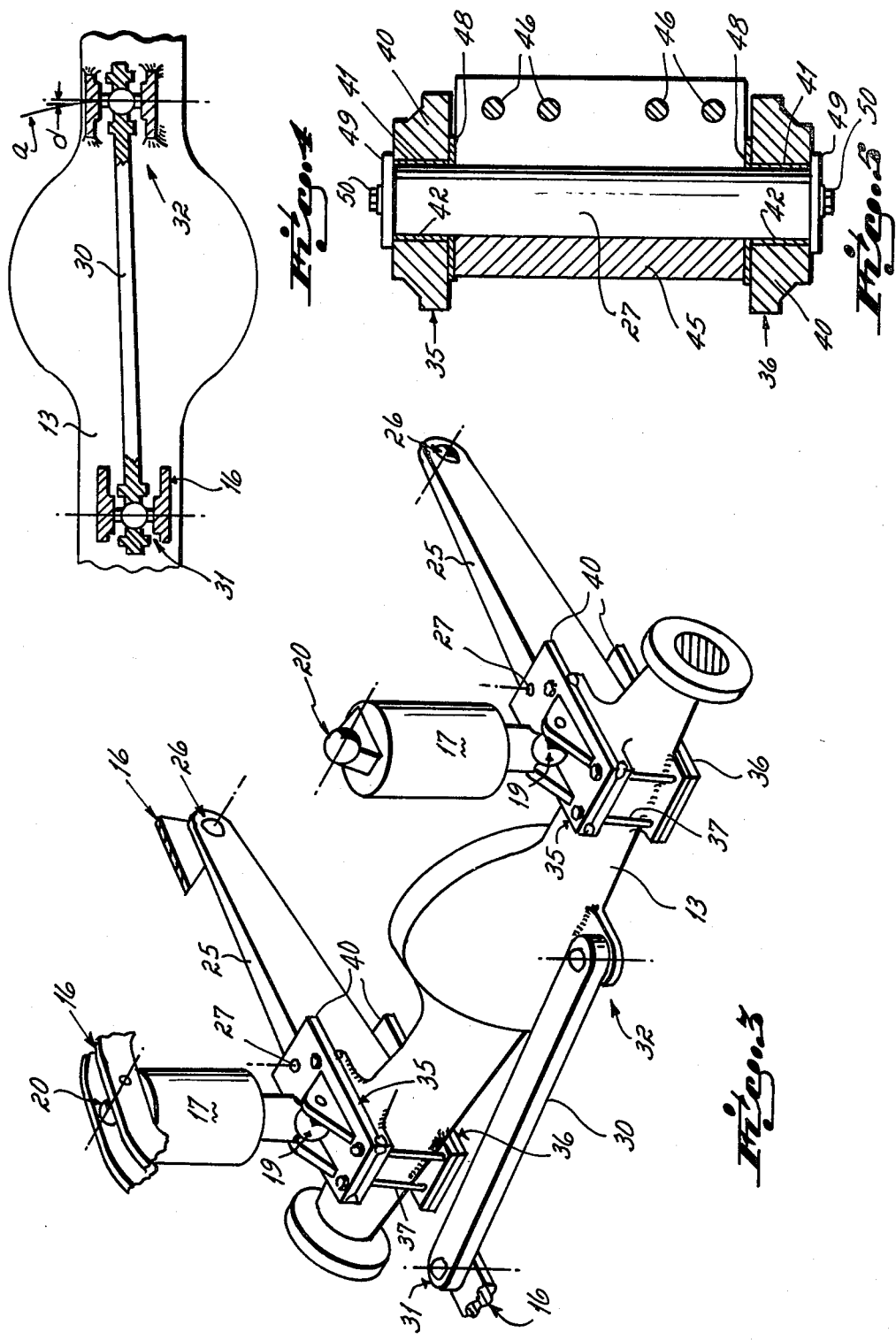

SUSPENSION FOR A TRACTOR-SCRAPER

This invention relates to a tractor for a tractor-scraper combination, and more particularly, the invention is directed to the suspension between the tractor axle housing and the frame of the tractor.

The scraper is equipment for moving dirt. A representative form of it is illustrated in U.S. Pat. No. 3,321,216, for example. The scraper has a large bowl suitable for carrying several yards of dirt. A two-wheel tractor is connected to the scraper and as it pulls the scraper along the ground, dirt is scraped into the bowl of the scraper. When the bowl is full, the tractor hauls the scraper to a suitable dumping area.

It is, of course, desirable to drive the tractor-scraper combination between the scraping site and the dumping site as rapidly as possible. Usually, the tractor has not been provided with any suspension. The only cushioning of shocks from the rough terrain comes from the pneumatic tires. When the tractor is driven over rough terrain at any speed above the most moderate speed the tractor and driver are subject to violent bouncing because of the absence of suspension. To minimize the bouncing, the tractor must be driven relatively slowly between scraping and dumping with consequent substantial inefficiency in the operation. It is therefore desirable to provide a suspension for the tractor to reduce substantially the violent bouncing which the driver is subjected to. For the reasons which are discussed hereafter, the known suspensions have been expensive and have been a maintenance headache requiring the frequent tightening of the bolts by which the suspension is secured to the axle housing.

These problems arise from the configuration of the known suspension which consists of hydraulic struts between the axle and frame, a pair of horizontal, longitudinally-extending arms which connect the axle housing to the frame and a transverse track bar which is pivoted to the axle and to the frame to keep the frame from shifting to the left and right with respect to the axle housing. The hydraulics struts are connected to an accumulator through a leveling circuit, one such circuit being shown in U.S. Pat. No. 4,205,864.

The longitudinal arms can be either leading arms, that is, projecting toward the front of the tractor, or trailing arms, projecting to the rear of the tractor. The arms have been bolted tightly to the axle housing. This configuration gives rise to several problems. When there is vertical movement of the axle housing relative to the frame, the track bar pivots through an arc of several degrees. During this pivoting, a frame will move vertically with respect to the axle housing by a substantial amount, for example, 5 inches. The swinging of the track bar through that arc forces the axle housing to move almost imperceptibly laterally with respect to the frame. That amount of movement is no greater than about ¼ inch but nevertheless has undesirable effects. That movement imposes a side loading on the longitudinal arms requiring the arms to be designed to withstand that loading. Further, close tolerances are required between the axle housing and the longitudinal arms to enable the joint at the axle housing to withstand the stress and to minimize the loosening of bolts at the joints. Notwithstanding the close tolerances between the axle housing and the arms, the stress causes the bolts by which the arms are connected to the axle housing to loosen with the requirement that they be tightened every few weeks.

It has been an objective of the present invention to provide a suspension configuration which eliminates the foregoing problems. That objective is attained by replacing the bolted connection of the longitudinal arms with a pivoted connection on vertical pivot pins. It has been found that the vertical pivot pins permit the axle housing to shift to left and right as the track bar pivots without imposing any undue stress on the longitudinal arms or their connection to the axle housing. Since the pivot connections relieve the side loading of the longitudinal arms, those arms may be made thinner and they may be made shorter. This modification in design results in a reduction in the weight of the arms by about 25%.

The pinned connection of the axle housing further eliminates the need for maintaining close tolerance in the manufacture of the housing and the arms. Finally, the pivot pin connection results in a much more maintenance-free suspension in the elimination of the requirement for periodic tightening of the bolt attachment of the arms to the axle housing.

The several features of the invention will become more readily apparent from the following detailed description taken in conjunction with the accompanying drawings in which:

FIG. 1 is a diagrammatic side view of a tractor-scraper employing the suspension of this invention;

FIG. 2 is an enlarged side view of a portion of FIG. 1.;

FIG. 3 is a diagrammatic perspective view of the suspension;

FIG. 4 is a cross-sectional view taken on line 4—4 of FIG. 2;

FIG. 5 is a cross-sectional view taken on line 5—5 of FIG. 2; and

FIG. 6 is a cross-sectional view taken on line 6—6 of FIG. 5.

A tractor-scraper combination 9 employing the present invention is illustrated in FIG. 1. The scraper is shown at 10 and the tractor which pulls it is shown at 11. The tractor has a pair of wheels 12 which are mounted on an axle housing 13. The tractor has a frame 16 which is supported on the axle housing by a pair of hydraulic struts 17. Each strut is connected to the axle housing by a spherical bushing 19 and to the frame by another spherical bushing 20. Each hydraulic strut has a hydraulic circuit which includes a gas-filled accumulator, the combination providing the cushioning between the frame and the housing. A suitable hydraulic circuit is disclosed in U.S. Pat. No. 4,205,864.

The axle housing 13 is maintained in desired longitudinal orientation with respect to the frame by longitudinal arms 25. In the illustrated form of the invention, the arms are trailing arms in that they project rearward of the axle housing and are connected at their trailing ends to the frame by spherical bushings 26. Each longitudinal arm is connected to the axle housing by a vertical pivot pin 27, to be described in greater detail below.

A track bar 30 is connected by means of a spherical bushing 31 to the frame 16 and by a spherical bushing 32 to the axle housing. It can be seen by reference to the diagrammatic illustration of FIG. 4 that as the suspension moves vertically with respect to the frame, the track bar 30 swings through an arc (a). As the track bar swings through the arc (a), the ball joint 32 connected to the axle housing moves laterally a distance (d) which is no more than about ¼ inch. It is that almost imperceptible lateral movement of the axle housing which gives rise to the problems discussed above. However, those problems are substantially eliminated by employing the vertical pivot pin 27 as the connection of the arms 25 to the axle housing 13.

As best shown in FIGS. 2, 3, and 5, the attachment of the arms 25 to the suspension includes upper and lower plates 35, 36 which are welded and bolted to the axle housing by means of four bolts 37 and nuts 38. The plates 35 and 36 present projecting flanges 40 having aligned upper and lower bores 41 (FIG. 5). Each bore receives a sleeve bearing 42 of some suitable material such as magnesium bronze alloy. The pin 27 is rotatably mounted in the sleeve bearings 42. The pivot pin 27 is tightly gripped in a C-shaped fitting 45 (FIGS. 5 and 6) which is closed around the pin 27 by bolts 46. The C-shaped fitting is separated from the upper and lower flanges 40 by washer-shaped thrust bearings 48. The pin and longitudinal arm assembly is secured between the two flanges by a retainer 49 which is bolted to the pin 27 by bolts 50.

In the operation of the invention, as the axle housing moves up and down with respect to the frame as, for example, by dropping into potholes and the like, the track bar 30 will swing up and down with respect to the frame. This swinging causes the axle housing to move laterally a distance (d) (FIG. 4). That swinging is permitting by the pivotal connection of the longitudinal arms 25 with respect to the axle housing. There is therefore no unusual stress caused by side loading against arms rigidly connected to the axle housing as in prior suspensions. As a result, there is no unusual stress on the elements connecting the frame to the axle housing, particularly including the longitudinal arms 25 and the bolted interconnection of the arms, the plates 35 and 36, and the axle housing 13.

Having described my invention, I claim:

1. In a scraper-tractor having an axle housing and a frame, a suspension for supporting said frame with respect to said housing comprising:
    a pair of laterally spaced brackets projecting from said housing,
    a pair of laterally spaced generally horizontal longitudinally-extending arms,
    pins pivotally securing one of the ends of said arms with respect to said housing brackets,
    ball joints securing the other ends of said arms to said frame,
    a vertical hydraulic spring pivotally mounted between said housing and said frame,
    and a generally horizontal transverse track bar pivotally mounted at its ends between said frame and axle housing, respectively.

2. A suspension as in claim 1 for which said pins have parallel axes.

3. In a scraper-tractor having an axle housing and a frame, a suspension for supporting said frame with respect to said axle housing comprising:
    a pair of laterally spaced, generally horizontal arms connected at one of their ends to said frame and extending longitudinally to said axle housing,
    means pivotally mounting the other ends of said arms to said axle housing on laterally spaced vertical axes,
    a vertical hydraulic spring pivotally mounted between said axle and said frame,
    and a generally horizontal transverse track bar pivotally mounted at its ends respectively to said frame and said axle.

4. A suspension as in claim 3 in which said pivotal mounting means comprises,
    upper and lower plates fixedly secured to each side of said axle housing,
    said plates having aligned bores on said vertical axes,
    sleeve bearings in said bores,
    upper and lower thrust bearings on the facing surfaces of said plates,
    a pin rotatably mounted in said sleeve bearings,
    and a C-shaped fitting on each end of said longitudinally-extending arms, said fitting being fixedly secured to said pin and having surfaces in contact with said thrust bearings.

* * * * *